(12) United States Patent
Hirao et al.

(10) Patent No.: US 9,298,444 B2
(45) Date of Patent: Mar. 29, 2016

(54) SOFTWARE UPDATING METHOD AND PORTABLE TERMINAL DEVICE

(75) Inventors: Yasuyuki Hirao, Tokyo (JP); Katsumi Aoyagi, Tokyo (JP); Toshihisa Sanbommatsu, Tokyo (JP); Tomohiro Ichikawa, Tokyo (JP); Kenji Asa, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 1285 days.

(21) Appl. No.: 12/126,444

(22) Filed: May 23, 2008

(65) Prior Publication Data
US 2009/0007090 A1 Jan. 1, 2009

(30) Foreign Application Priority Data
Jun. 28, 2007 (JP) .................... 2007-170673

(51) Int. Cl.
G06F 17/30 (2006.01)
G06F 9/445 (2006.01)
H04M 1/725 (2006.01)

(52) U.S. Cl.
CPC ............ *G06F 8/65* (2013.01); *G06F 17/30153* (2013.01); *H04M 1/72525* (2013.01)

(58) Field of Classification Search
CPC ................................................ G06F 17/30153
See application file for complete search history.

(56) References Cited

U.S. PATENT DOCUMENTS

| 5,974,426 | A * | 10/1999 | Lee et al. | |
| 6,463,501 | B1 * | 10/2002 | Kern et al. | 711/100 |
| 7,756,833 | B2 * | 7/2010 | Van Ingen et al. | 707/640 |
| 2007/0083571 | A1 * | 4/2007 | Meller et al. | 707/203 |

FOREIGN PATENT DOCUMENTS

JP    2006-309516    11/2006

* cited by examiner

*Primary Examiner* — Usmaan Saeed
*Assistant Examiner* — Paul Kim
(74) *Attorney, Agent, or Firm* — Oblon, McClelland, Maier & Neustadt, L.L.P.

(57) ABSTRACT

A software updating method for updating software stored as compressed code in a nonvolatile memory provided in a portable terminal on the basis of differential data via wireless communication includes the steps of providing a file system area having a fault-tolerant property; decompressing, at the execution of software updating, the compressed code of the software and loading the decompressed code into a random-access memory; updating the software in the random-access memory on the basis of the differential data; compressing the updated software; and storing a backup of a compressed updated code sequence corresponding to a compressed updated portion of the compressed updated software in the file system area and then writing the compressed updated code sequence corresponding to the compressed updated portion of the compressed updated software back to the nonvolatile memory.

13 Claims, 13 Drawing Sheets

| FIG. 4A |
| FIG. 4B |

|  | SIZE | START BLOCK | END BLOCK |
|---|---|---|---|
| COMPRESSED COMPONENT 1 | aa | aa_start | aa_end |
| COMPRESSED COMPONENT 2 | bb | bb_start | bb_end |
| COMPRESSED COMPONENT 3 | cc | cc_start | cc_end |
| ⋮ | ⋮ | ⋮ | ⋮ |
| COMPRESSED COMPONENT N | nn | nn_start | nn_end |

SOFTWARE UPDATING METHOD AND PORTABLE TERMINAL DEVICE

CROSS REFERENCES TO RELATED APPLICATIONS

The present invention contains subject matter related to Japanese Patent Application JP 2007-170673 filed in the Japanese Patent Office on Jun. 28, 2007, the entire contents of which are incorporated herein by reference.

BACKGROUND OF THE INVENTION

1. Field of the Invention

The present invention relates to portable terminal devices, and more particularly, to a software updating method for updating software stored in a nonvolatile memory provided in a portable terminal on the basis of differential data acquired via wireless communication.

2. Description of the Related Art

Nowadays, portable terminals, such as cellular phones, are widely used. In order to add functions to, improve the performance of, correct failures of, and the like for such portable terminals, it is necessary to update software such as programs stored in memories of the portable terminals. Firmware over-the-air (FOTA) technology for implementing software updating for a portable terminal via wireless communication by using a rewritable nonvolatile memory, such as a flash memory, for storing software is available (see, for example, Japanese Unexamined Patent Application Publication No. 2006-309516).

As functions of software for portable terminals become more complicated, a necessary memory capacity increases. Thus, the cost of memory devices increases, and the increase in the cost of memory devices affects product prices.

In order to solve the above-mentioned problem, a method for loading software that has been compressed in advance into a memory and decompressing the compressed software when the software is to be executed has been suggested. According to this method, the size of the software itself is reduced. Thus, a certain level of effect in terms of a reduction in a necessary memory capacity can be expected. However, since extra time is necessary for decompressing compressed software, a reduction in a starting time is not expected.

Rewritable nonvolatile semiconductor memories, such as flash memories, are used as memory devices for portable terminals.

Thus, a flash memory is used for storing a program for a portable terminal. In the case that booting (booting up) is performed from such a flash memory, a program in a program area is temporarily transferred from the flash memory to a random-access memory (RAM), and the program is executed in the RAM.

In the case where code that has been compressed in advance is stored in a flash memory, the size of the code to be loaded from the flash memory into a RAM is reduced. Thus, a free space of the memory increases, and the increased free space can be used as a storage area.

However, since it is necessary to decompress compressed code when booting is to be executed, it takes a long time to start software.

In the case of updating software constituted by compressed code by using FOTA, the following sequence is executed:

1) decompress compressed code in a flash memory and transfer the decompressed code to a RAM as the original code, 2) update software in accordance with the decompressed software and a differential file acquired via wireless communication, and 3) compress the updated software in a portable terminal and write the compressed updated software back to the flash memory.

SUMMARY OF THE INVENTION

In the above-described sequence, if a power-off occurs when the compressed updated software is being written back to the flash memory, not only is the compressed updated code in the RAM damaged, the compressed code before updating is also damaged due to overwriting of the compressed code before updating with the compressed updated code. Thus, after the power is recovered, decompression of the compressed code before updating to resume software updating is not performed.

In addition, software updating processing for updating compressed software in a flash memory takes a relatively long time due to the execution of the above-described sequence. Thus, it is more likely that a power-off of the portable terminal may occur due to battery exhaustion in the process of writing back to the flash memory.

It is desirable to allow a portable terminal device to resume, even if a power-off of the portable terminal device occurs when compressed updated software is being written to a nonvolatile memory, software updating after the power of the portable terminal device is recovered.

A software updating method according to an embodiment of the present invention for updating software stored as compressed code in a nonvolatile memory provided in a portable terminal on the basis of differential data via wireless communication includes the steps of providing a file system area having a fault-tolerant property; decompressing, at the execution of software updating, the compressed code of the software and loading the decompressed code into a random-access memory; updating the software in the random-access memory on the basis of the differential data; compressing the updated software; and storing a backup of a compressed updated code sequence corresponding to a compressed updated portion of the compressed updated software in the file system area and then writing the compressed updated code sequence corresponding to the compressed updated portion of the compressed updated software back to the nonvolatile memory.

Before the compressed updated code sequence corresponding to the compressed updated portion of the compressed updated software is written to the nonvolatile memory, a backup of the compressed updated code sequence is stored in the file system area having the fault-tolerant property. Thus, even in the case that a failure in the writing back to the nonvolatile memory occurs due to a power-off at the execution of the software updating, after a power is recovered, the compressed updated code sequence corresponding to the compressed updated portion of the compressed updated software stored in the file system area is written back to a corresponding area of the nonvolatile memory and then the software updating can be resumed.

More specifically, the software may be divided into a plurality of components, the plurality of components may be compressed, and the compressed plurality of components may by stored in the nonvolatile memory. At the execution of the software updating, all the compressed plurality of components of the software may be decompressed and the decompressed components may be loaded into the random-access memory. Only a component to be updated may be updated in the random-access memory on the basis of the differential data. Only the updated component may be compressed, and the compressed updated component may be written back to a corresponding area of the nonvolatile memory.

In the case of storing in the file system area the backup of the compressed updated code sequence corresponding to the compressed updated portion of the compressed updated software in the nonvolatile memory, only the compressed updated component can be stored in the file system area.

An embodiment of the present invention can also be applied to a computer program for implementing the above-described portable terminal device having the function of updating software stored as compressed code in a nonvolatile memory provided in a portable terminal on the basis of differential data via wireless communication or such a function.

According to an embodiment of the present invention, before a compressed updated code sequence corresponding to a compressed updated portion of compressed updated software is written to the nonvolatile memory, a backup of the compressed updated code sequence is stored in the file system area having the fault-tolerant property. Thus, even after a power-off occurs when updated data is being written to the nonvolatile memory, the validity of the software in the nonvolatile memory can be maintained and the software updating can be reduced.

DESCRIPTION OF THE PREFERRED EMBODIMENTS

Embodiments of the present invention will be described with reference to the drawings.

Figure 1:
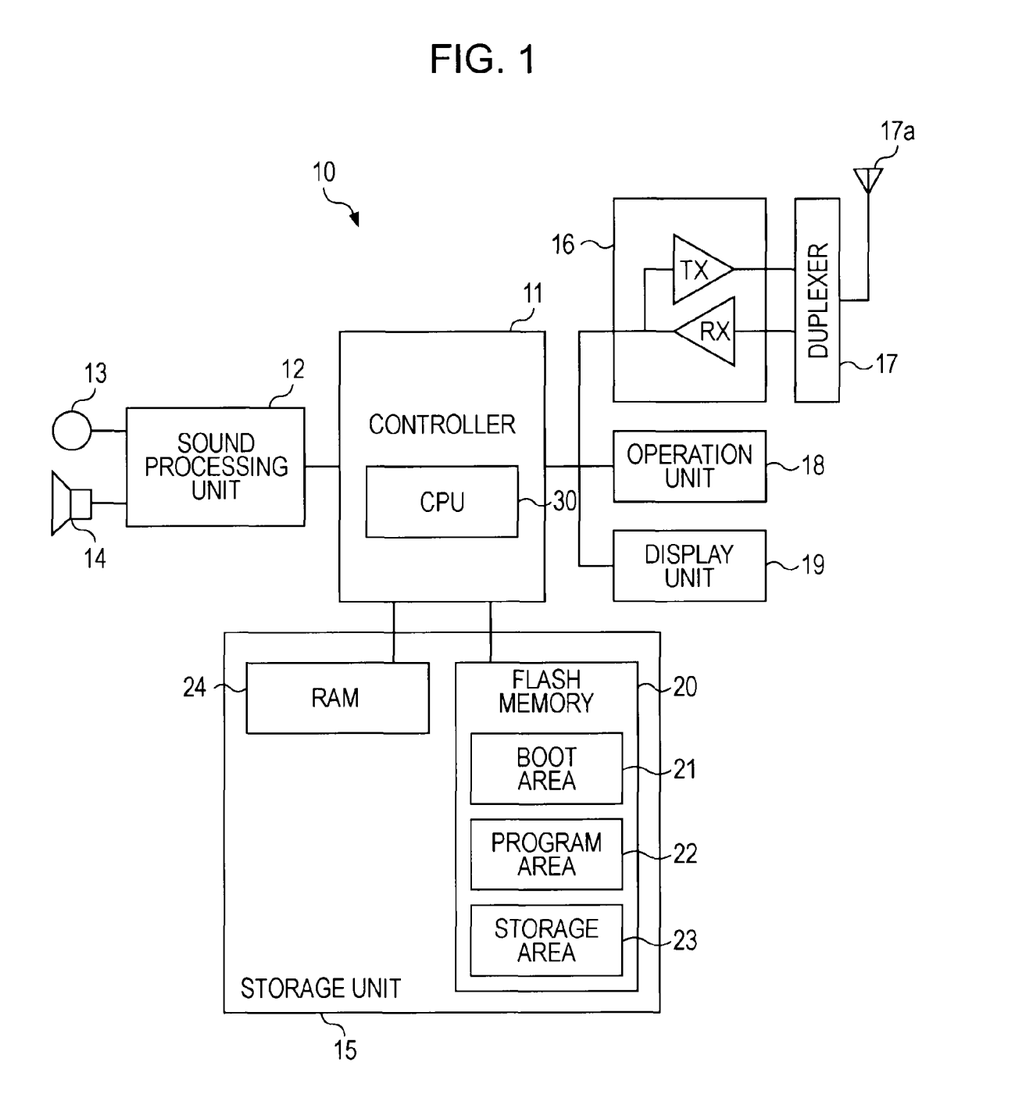
FIG. 1 is a block diagram schematically showing an example of the hardware configuration of a portable terminal according to an embodiment of the present invention.

FIG. 1 is a block diagram schematically showing an example of the hardware configuration of a portable terminal 10 according to an embodiment of the present invention. In this embodiment, an example in which a cellular phone is used as the portable terminal 10 will be described.

The portable terminal 10 includes a controller 11, a sound processing unit 12, a microphone 13, a speaker 14, a storage unit 15, a communication unit 16, a duplexer 17, an antenna 17a, an operation unit 18, and a display unit 19.

The controller 11 includes a central processing unit (CPU) 30 contained in a large-scale integrated (LSI) circuit for cellular phones. The controller 11 serves as a data processing unit configured to control processing of the portable terminal 10 and each unit constituting the portable terminal 10.

The sound processing unit 12 performs sound processing for conversation, music playback, and the like under the control of the controller 11. In addition, the sound processing unit 12 receives voices from the microphone 13 and outputs voices to the speaker 14.

The storage unit 15 stores therein programs and data. In this embodiment, the storage unit 15 includes a nonvolatile flash memory 20, such as an NAND memory, and a random-access memory (PAM) 24, such as a synchronous dynamic random-access memory (SDRAM).

The flash memory 20 is a rewritable nonvolatile memory for storing a program to be executed by the controller 11. The flash memory 20 includes a boot area 21 for storing a boot program, a program area 22 for storing program code, and a storage area 23 for storing other necessary data and programs. The storage area 23 includes a file system area for storing such data. The file system area has a fault-tolerant property. With the fault-tolerant property, even when the power is turned off, data in the file system area is not damaged. Such a file system area is used for storing various types of data, such as a telephone directory, electronic mails, web contents, music, and images, as well as programs.

When booting is performed in accordance with the boot program, the program area 22 is loaded into the RAM 24, and software such as a program is executed in the RAM 24. More specifically, when the power is supplied to the controller 11 and the storage unit 15, the contents of the boot area 21 of the flash memory 20 are read to a memory area of the controller 11 and are executed on the basis of a built-in logic in the controller 11. Boot processing defined by an embodiment of the present invention is incorporated in the program. Program code to be executed is loaded from the flash memory 20 into the RAM 24 in accordance with the program, and the program is executed in the RAM 24.

The communication unit 16 performs transmission and reception to and from a base station (not shown) using the antenna 17a via wireless communication under the control of the controller 11. The duplexer 17 is an antenna duplexer. That is, a single antenna is shared between transmission and reception signals, and the duplexer 17 includes a filter circuit having a function of transmitting to a reception unit a reception signal received from an antenna and transmitting to the antenna a transmission signal transmitted from a transmission unit.

The operation unit 18 includes numeric keys and various control keys. The operation unit 18 has a function of transmitting to the controller 11 an instruction and information received from a user.

The display unit 19 includes a display device, such as a liquid crystal display (LCD) or an organic electroluminescence (EL) device. The display unit 19 has a function of displaying visible information, such as text or an image (static image or moving image), for the user.

An operation to be performed in this embodiment will now be described.

Figure 2:
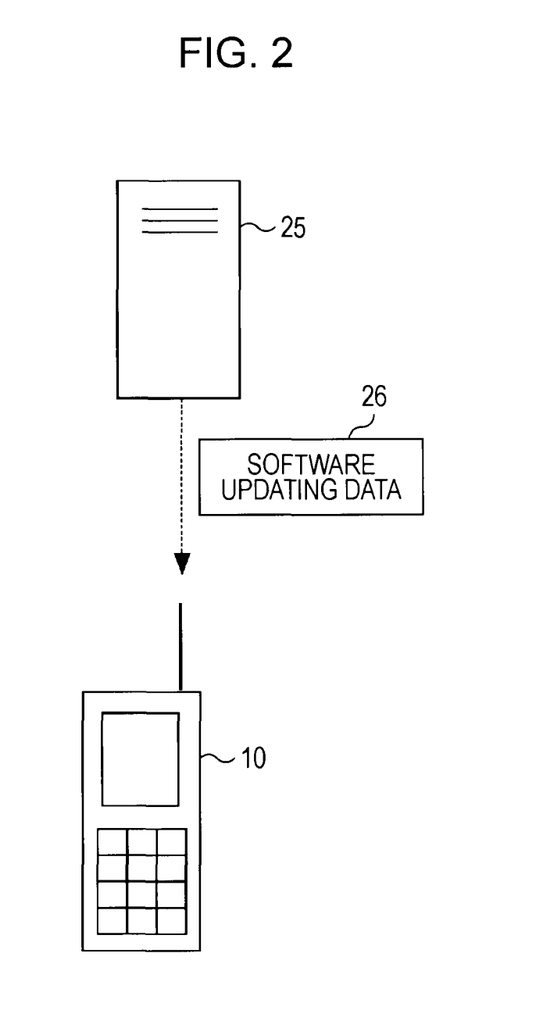
FIG. 2 illustrates a state where the portable terminal downloads data necessary for software updating via wireless communication.

Referring to FIG. 2, using FOTA, in a case where it is necessary to update software, a software provider stores data necessary for updating in a distribution server 25 on a network, such as the Internet, and the portable terminal 10 downloads the data necessary for updating via wireless communication. A flash memory includes a software storage area and a file system area. The data necessary for updating is stored in the file system area.

The software provider generates, as a difference between an old version and a new version, the data necessary for updating, and stores the necessary data in the distribution server 25. Such differential data is generated by comparing uncompressed original code of the old software and uncompressed original code of the new software.

Figure 3:
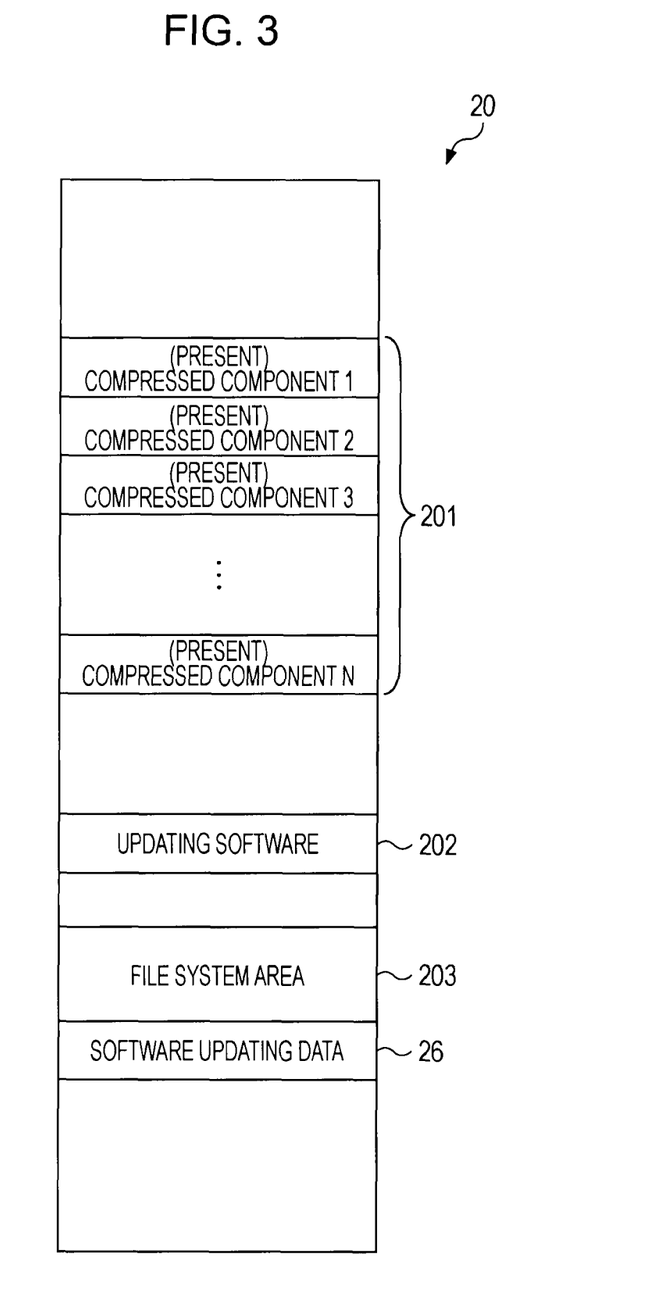
FIG. 3 schematically shows a software storage area before updating in a flash memory of a portable terminal according to an embodiment of the present invention.

FIG. 3 schematically shows a software storage area before updating in the flash memory 20 of the portable terminal 10. In the program area 22 (see FIG. 1) of the flash memory 20, before-updated software 201 including a plurality of compressed components 1 to N, updating software 202, which is a program in which an updating procedure is written, and software updating data 26, which is differential data for software updating, are stored. The software updating data 26 is not necessarily compressed. In addition, in the storage area 23 (see FIG. 1) of the flash memory 20, a file system area 203 to be used by the file system is provided. The software updating data 26 is downloaded in advance from the distribution server 25, as described above.

Figure 4:
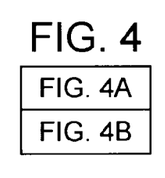
FIG. 4 illustrates a procedure for software updating utilizing code compression in an embodiment of the present invention.
Figure 4A:
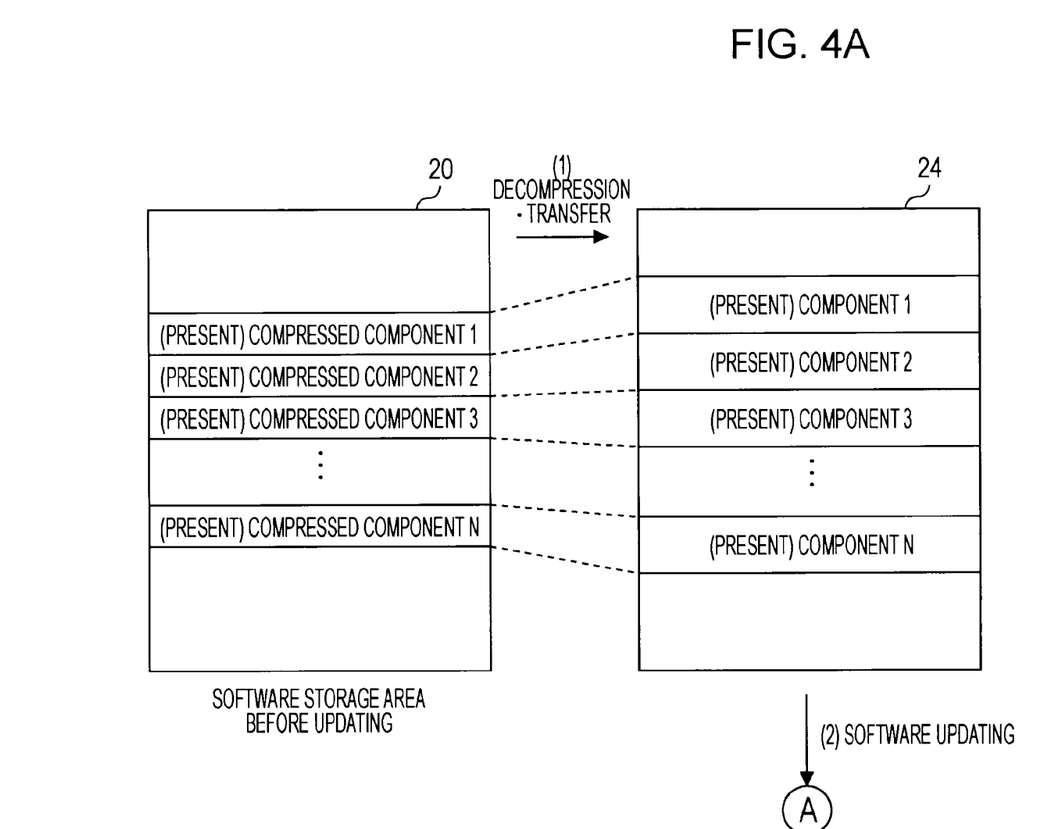
Figure 4B:
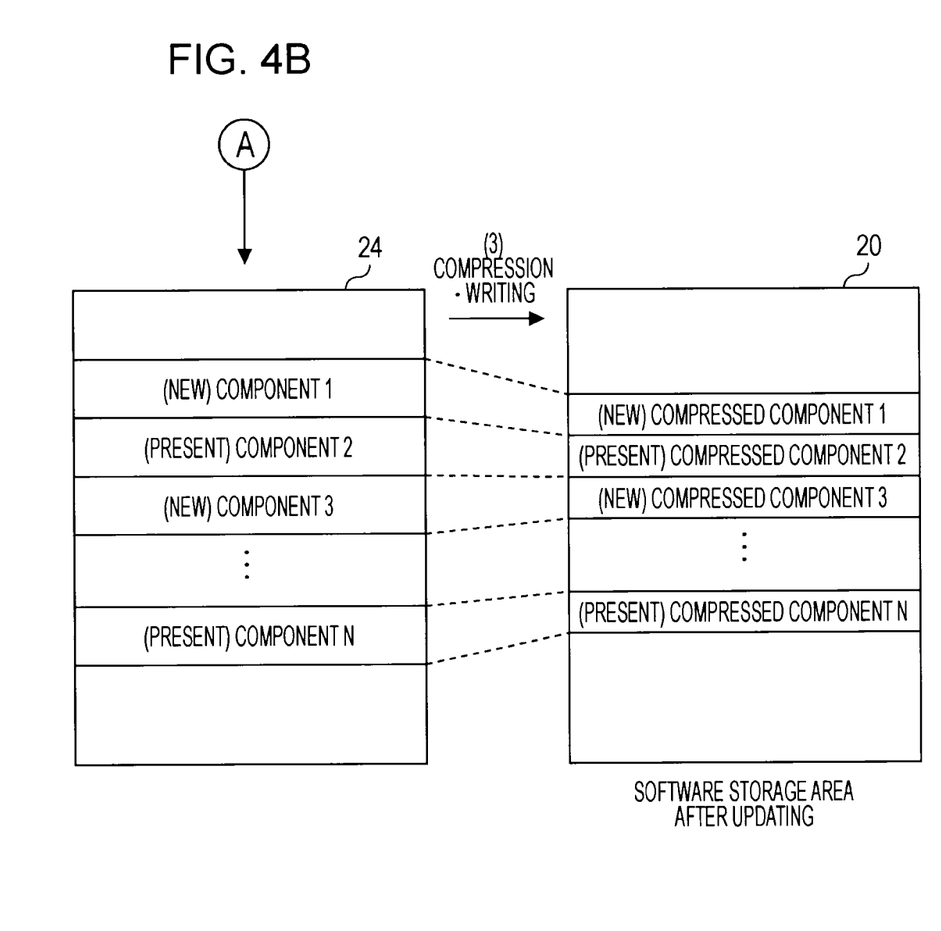

FIG. 4 illustrates a procedure for software updating utilizing code compression.

In the case that the portable terminal 10 updates an old version of software on the basis of the software updating data 26 (differential data) acquired from the distribution server 25, since the old version of software is compressed and stored in the flash memory 20, the differential data is not directly used. Thus, in the case of FOTA of the related art utilizing code compression for portable terminals, code obtained by compressing each of a plurality of components constituting software is temporarily decompressed, and the decompressed code is loaded into the RAM 24 and is converted into original uncompressed code (1). All the components are decompressed and loaded into the RAM 24 because even a component not to be updated may be referred to by updating software. Then, software updating is performed using differential data for the uncompressed code in the RAM 24 (2). The example of FIG. 4 shows a case where components 1 and 3 are updated in the software updating. Then, updated code is compressed and the compressed updated code is written back to the flash memory 20 (3).

Figure 5:
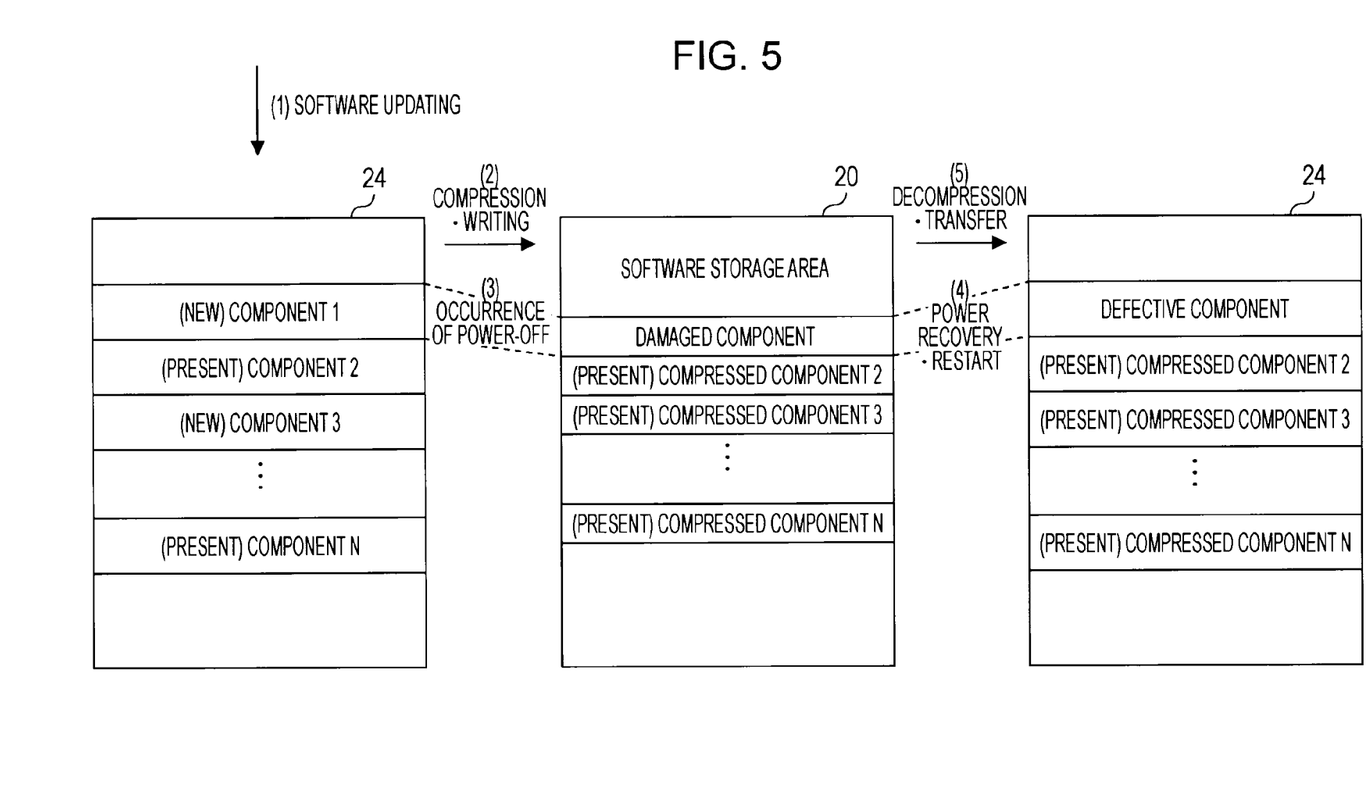
FIG. 5 illustrates a case where a power-off occurs when an updated code sequence is compressed and written back to the flash memory in an embodiment of the present invention.

FIG. 5 illustrates a case where a power-off occurs when an updated code sequence is compressed and written back to the flash memory 20. In the software updating processing shown in FIG. 4, it is assumed, for example, that a power-off occurs (3) when a compressed updated code sequence is being written back to the flash memory 20 (2). In this case, a compressed code sequence before updating is damaged. As a result, even if decompression and transfer of the compressed code sequence are performed (5) at the restart after the power is recovered (4), decompression is not performed successfully. Thus, a component in the RAM corresponding to the damaged component becomes defective, and updating processing is not resumed.

Normally, portable terminals use a battery as a power source. Due to a reduction in the residual amount of a battery or falling of a battery pack caused by falling of the terminal or the like, it is more likely that a power-off may occur when processing is being performed, compared with a stationary device.

According to an embodiment of the present invention, using FOTA utilizing code compression for portable terminals, resumption of updating processing can be ensured, irrespective of the timing when a power-off occurs.

Figure 6:
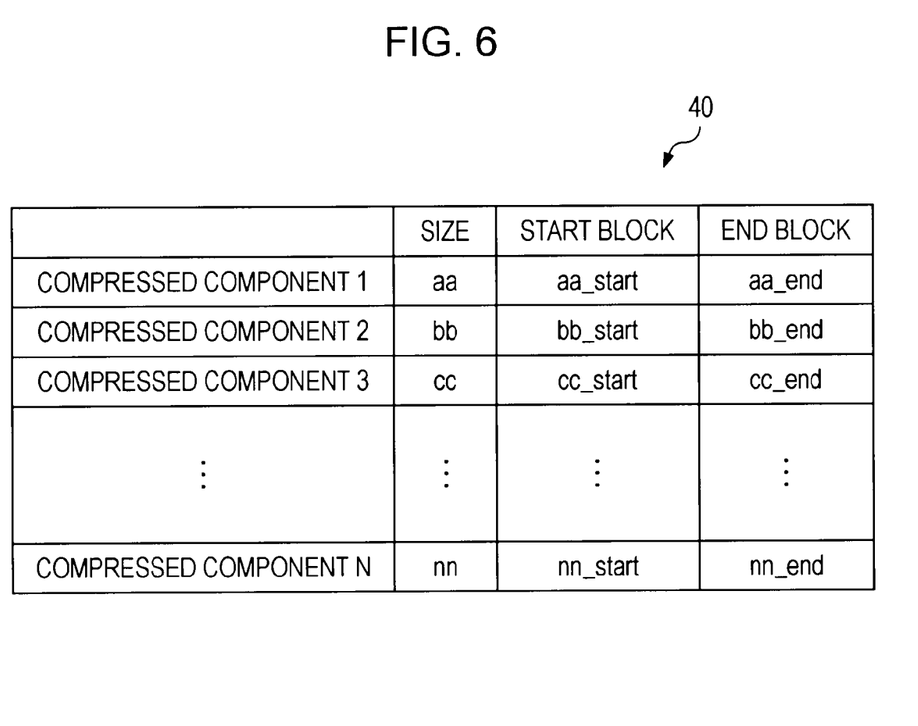
FIG. 6 shows an example of the configuration of a data table used in the embodiment.

FIG. 6 shows an example of the configuration of a data table 40 used in this embodiment. The data table 40 defines the sizes of compressed components and positions (from the start blocks to the end blocks) where the compressed components are stored in the flash memory 20. The data table 40 is held in advance in a predetermined area of the storage unit 15 of the portable terminal 10. In the data table 40, for individual compressed components constituting a software program, the sizes of the compressed components and start blocks and end blocks of the compressed components in the flash memory 20 are stored. The data table 40 is generated when software is stored in the flash memory 20 and the generated data table 40 is stored in the storage unit 15. When software updating is performed, the contents of the data table 40 are also updated where necessary.

Figures 7, 7A:
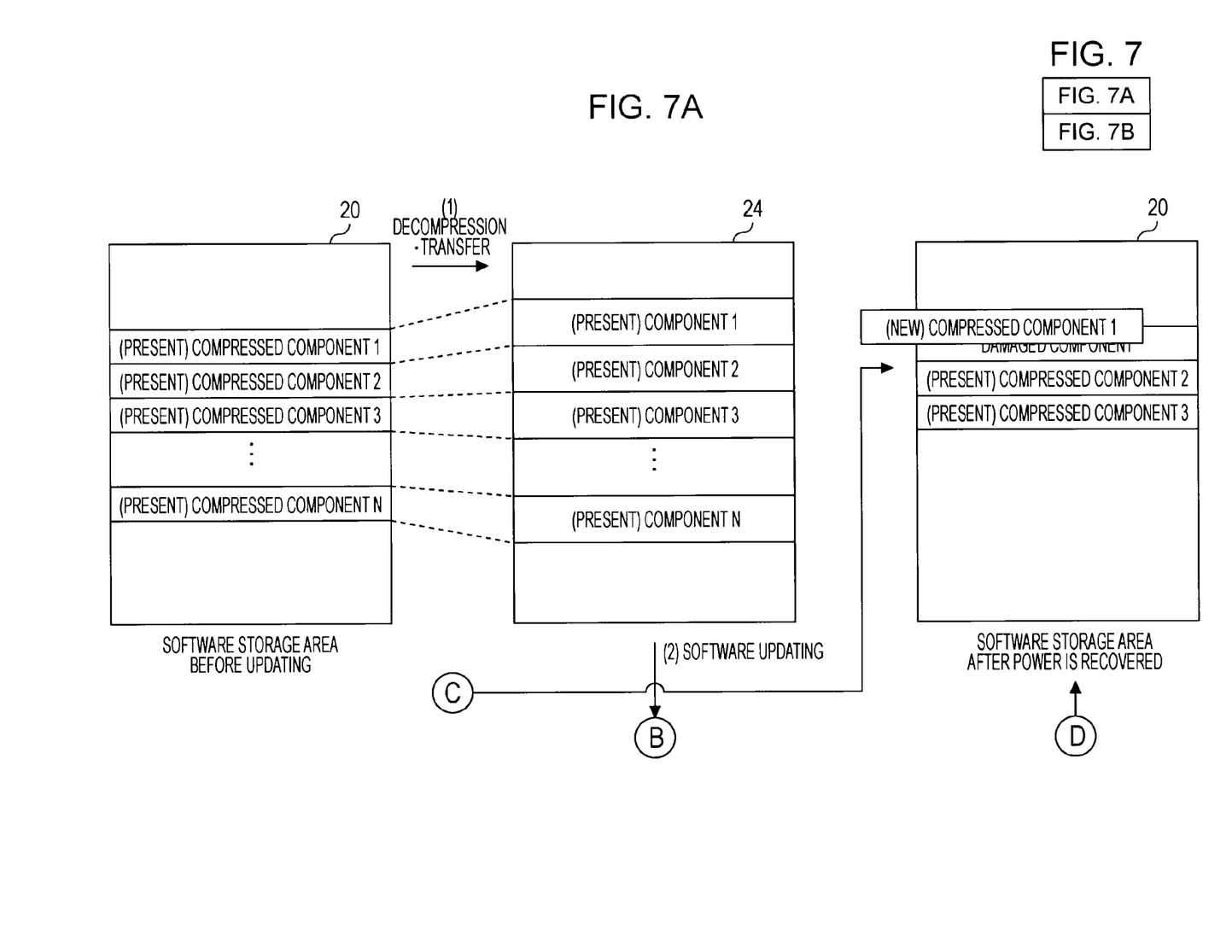
FIG. 7 illustrates a procedure in which in the case that a power-off occurs, compressed code before updating is recovered by using a backup of data in a file system area in the embodiment.
Figure 7B:
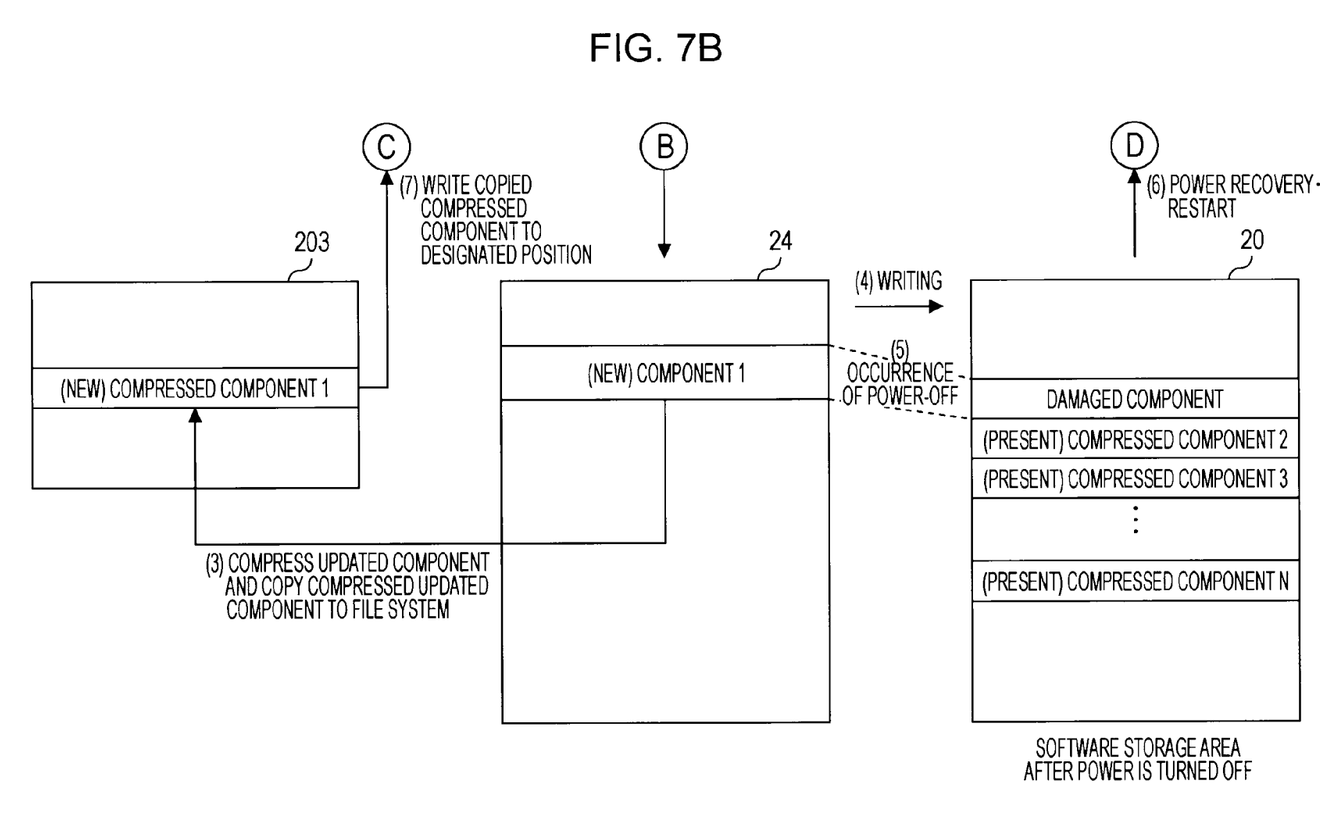

A procedure in which in the case that a power-off occurs, compressed code before updating is recovered by using a backup of data in the file system area will be described with reference to FIG. 7.

When updating processing is performed, software before updating in the flash memory 20 is decompressed and the decompressed software is transferred to the RAM 24 (1), as described above. Then, updating of a component in the RAM 24 is completed (2), and a compressed code sequence corresponding to the updated component is copied to the file system area 203 (3). In the case of copying, a value in the data table 40 is referred to, and the position of the compressed code sequence corresponding to the component to be copied is also copied to the file system area 203. Accordingly, by referring to the data table 40, only a component to be updated can be backed up in the file system area 203. Then, compressed code sequence corresponding to the updated component is written back to the flash memory 20 (4). In the case that a power-off occurs when the writing is being performed (5), data of the component (a component 1 in the example shown in FIG. 7) that is being written to the flash memory 20 is damaged due to the interruption of updating processing.

After the power supply is recovered (6), the compressed code sequence corresponding to the updated component that has been copied to the file system area 203 is written to an appropriate position (designated position) in the flash memory 20 (7). Thus, the component that is being subjected to writing processing is updated. In the case that the component is decompressed and transferred to the RAM 24 again, updating processing for the next component to be updated can be normally resumed.

Figures 8, 8A:
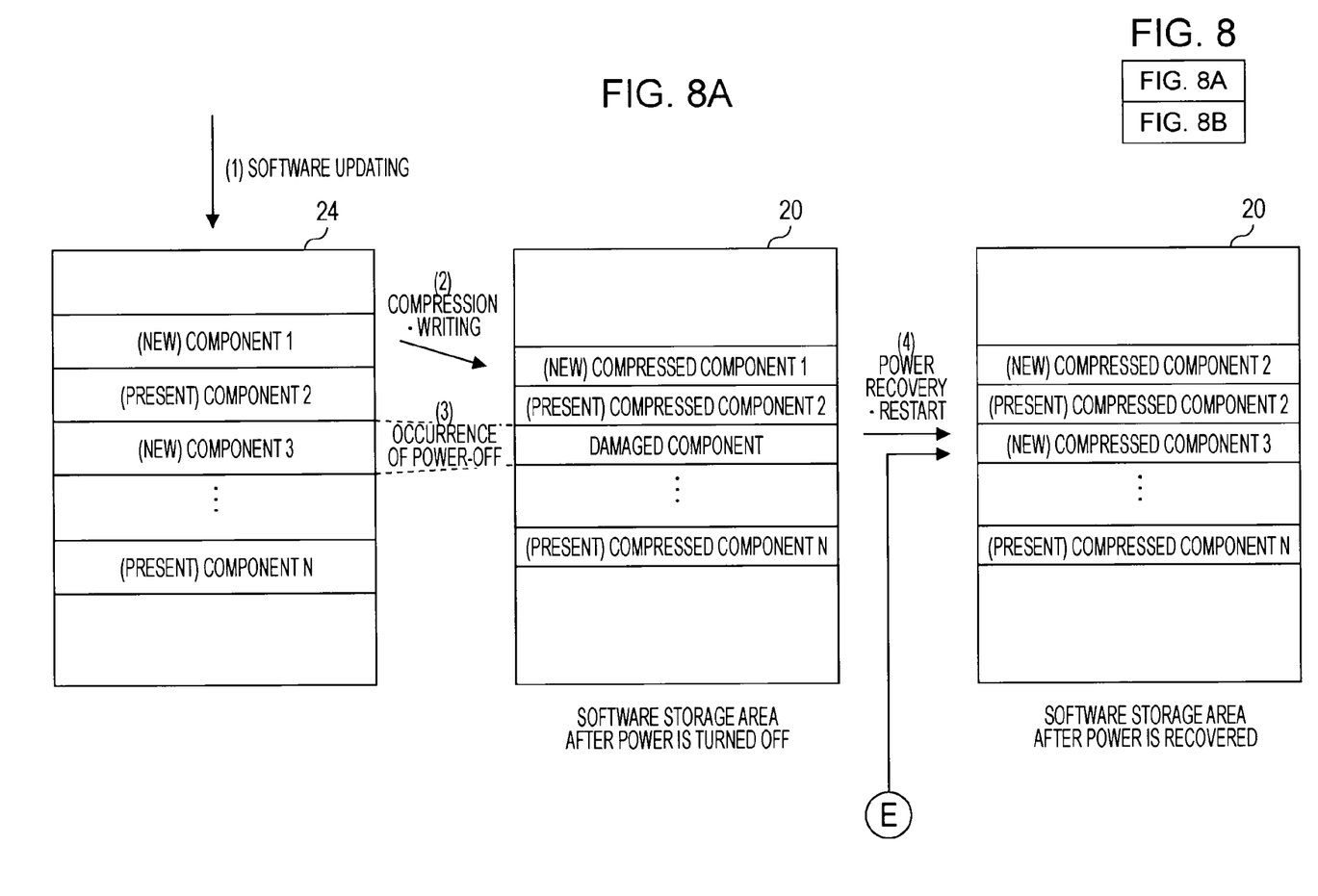
FIG. 8 illustrates a procedure for resuming updating processing after a power-off occurs in the embodiment.
Figure 8B:
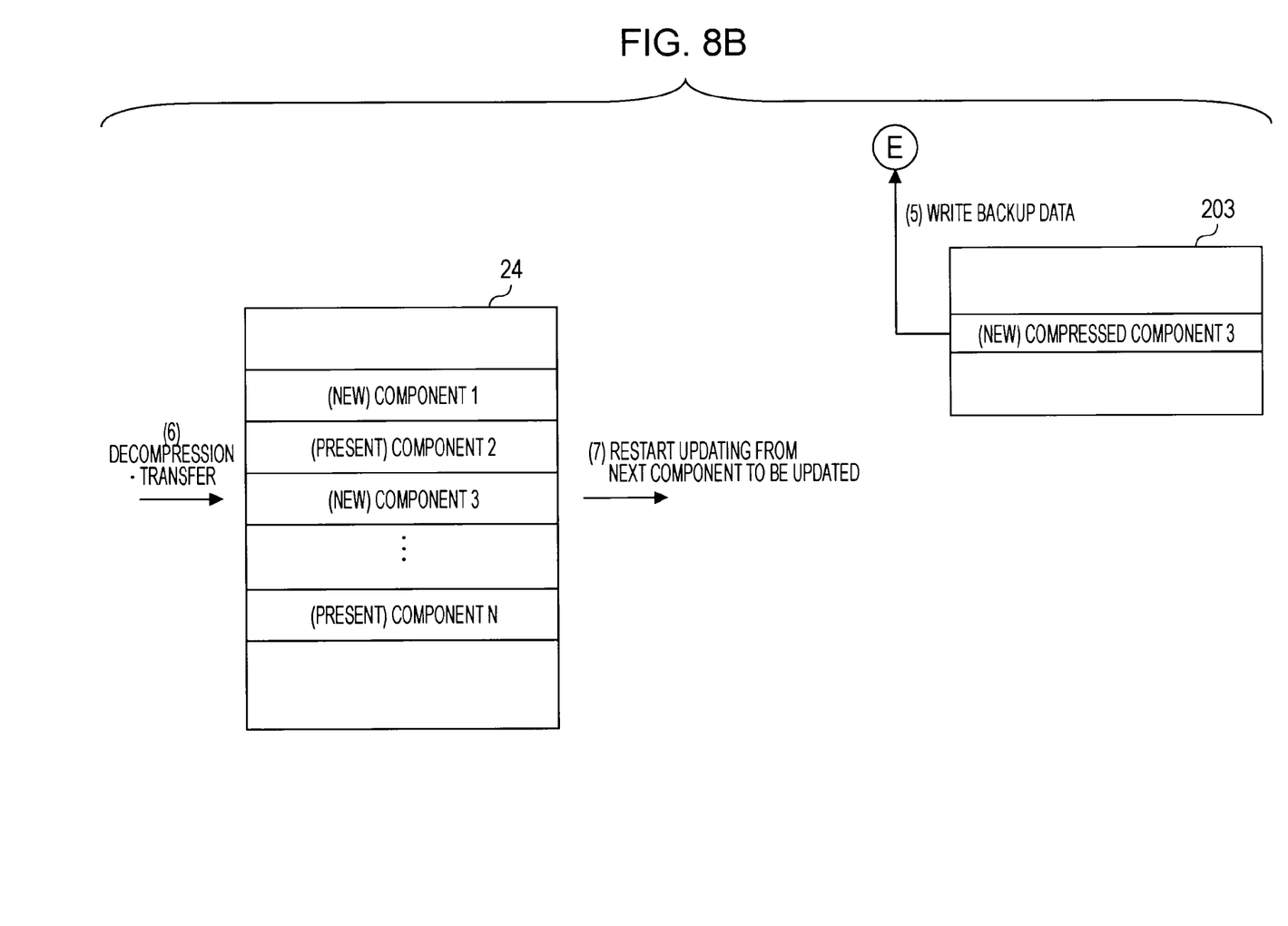

A procedure for resuming updating processing after a power-off occurs will be described with reference to FIG. 8. After the components 1 to N are decompressed and the decompressed components 1 to N are transferred to the RAM 24 again, software updating is performed (1). In this case, updating processing is resumed from the component to be updated that is subsequent to the component that was being subjected to writing processing when the last power-off occurred. In this example, it is assumed that, after compression and writing of the component 1 are performed (2), a power-off occurs again when a compressed component 3 is being written to the flash memory 20 (3). Prior to the writing of the component 3 to the flash memory 20, a compressed code sequence corresponding to the component 3 is copied to the file system area 203. In the case that a power-off occurs when the compressed code sequence corresponding to the component 3 is being written to the flash memory 20, an area of the corresponding component in the flash memory 20 is damaged. However, after the power is recovered and restarted (4), the compressed component 3 that has been backed up in the file system area 203 is read and the read compressed component 3 is written to a corresponding position in the flash memory 20 (5). Thus, a state where updating of the component 3 is completed is achieved, and updating processing can be resumed from the next component to be updated (6) and (7).

Figure 9:
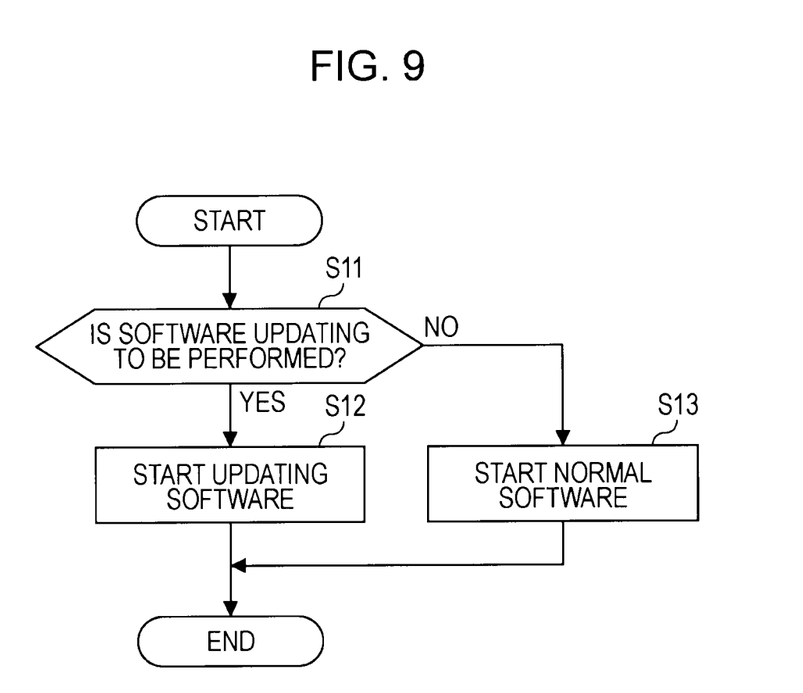
FIG. 9 is a flowchart schematically showing a process to start a portable terminal in an embodiment of the present invention.

FIG. 9 is a flowchart schematically showing a process to start the portable terminal 10 according to this embodiment. The process shown in FIG. 9 is performed by the controller 11 shown in FIG. 1.

The controller 11 determines whether software updating is to be performed (step S11). The determination in step S11 is performed by checking if a predetermined flag is set, the flag being set when differential data for updating is downloaded. If it is determined in step S11 that software updating is not to be performed, normal software is started (step S13). If it is determined in step S11 that software updating is to be performed, updating software is started (step S12). That is, the updating software 202 in the flash memory 20 is loaded into the RAM 24, and the updating software 202 is executed. If the updating software 202 has been compressed, decompression of the updating software 202 is performed before the updating software 202 is loaded into the RAM 24.

Figure 10:
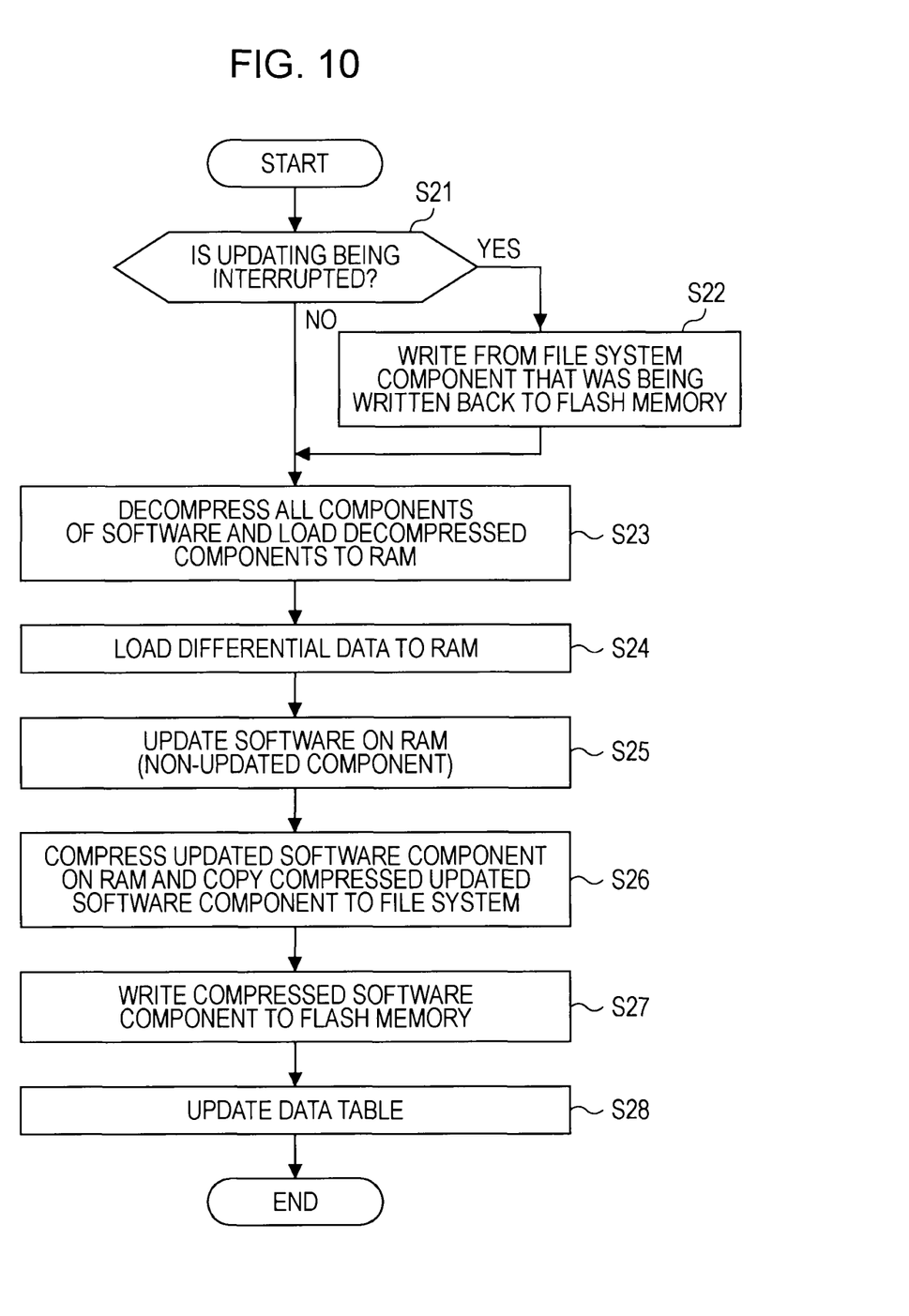
FIG. 10 is a flowchart schematically showing a software updating process.

FIG. 10 is a flowchart schematically showing a software updating process. The software updating process is also performed by the controller 11.

The controller 11 determines whether updating processing is being interrupted due to a power-off or the like (step S21). The determination of step S21 is performed as described below. That is, after updating processing is started, information indicating the last component for which updating has been completed is recorded in a nonvolatile manner, so that the information can be referred to when the updating processing is started.

If it is determined in step S21 that the updating processing is being interrupted, a component that was being subjected to writing processing is written from the file system area 203 to a corresponding area of the flash memory 20 (step S22). A block of the nonvolatile memory where the component to be updated is stored can be identified by referring to the data table 40.

Then, all the components of software to be updated are decompressed, and the decompressed components are loaded into the RAM 24 (step S23). Then, differential data of the software to be updated is loaded into the RAM 24 (step S24). The processing of steps S23 and S24 may be performed in an inverse order.

Then, the loaded software to be updated is updated in the RAM 24 on the basis of the differential data (step S25). In this case, a component that has been updated is excluded from targets to be processed. After updating of all the components to be updated is completed, the updated software components in the RAM 24 are compressed and the compressed updated software components are copied to the file system (step S26). Then, the compressed software components are written back to corresponding areas of the flash memory 20 (step S27). If necessary, the data table 40 is updated (step S28).

Although preferred embodiments of the present invention have been described above, various modifications and changes may be made to the present invention without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A software updating method for updating software stored as compressed code in a nonvolatile memory provided in a portable terminal on the basis of differential data via wireless communication, the method comprising the steps of:
   providing a file system area having a fault-tolerant property;
   decompressing, at the execution of software updating, the compressed code of the software and loading the decompressed code into a random-access memory;
   updating the software in the random-access memory on the basis of the differential data;
   compressing, by processing circuitry, the updated software; and
   storing a backup of a compressed updated code sequence corresponding to a compressed updated portion of the compressed updated software in the file system area;
   writing the compressed updated code sequence corresponding to the compressed updated portion of the compressed updated software back to the nonvolatile memory only after storing, in the file system area, the backup of the compressed updated code sequence and position information indicating a position in the nonvolatile memory at which the backup should be written to if a power failure occurs; and
   writing, based on the position information, the backup of the compressed updated code sequence stored in the file system area to the nonvolatile memory after a failure occurs and after power is recovered,
   wherein the fault-tolerant property ensures that data, including the compressed updated code sequence, stored in the file system area is not damaged when the failure occurs,
   wherein, based on the differential data, only the backup of the compressed updated code sequence corresponding to the compressed updated portion of the compressed updated software in the nonvolatile memory and the position information are stored in the file system area.

2. The software updating method according to claim 1, wherein the failure relates to the writing back to the nonvolatile memory occurs due to a power-off at the execution of the software updating, and
   after the power is recovered, the compressed updated code sequence stored in the file system area is written back to a corresponding area of the nonvolatile memory and then the software updating is resumed.

3. The software updating method according to claim 1 or 2, wherein the software is divided into a plurality of components, the plurality of components are compressed, and the compressed plurality of components are stored in the nonvolatile memory,
   wherein at the execution of the software updating, all the compressed plurality of components of the software are decompressed and the decompressed components are loaded into the random-access memory,
   wherein only a component to be updated is updated in the random-access memory on the basis of the differential data, and
   wherein only the updated component is compressed, and the compressed updated component is written back to a corresponding area of the nonvolatile memory.

4. The software updating method according to claim 3, wherein in the case of storing the compressed code of the software in the nonvolatile memory, a data table defining positions where the compressed components are stored in the nonvolatile memory is generated and the generated data table is stored in a nonvolatile manner, and wherein in the case of storing the compressed updated component in the file system area, the position where the compressed updated component is to be stored in the nonvolatile memory is identified by referring to the data table.

5. A portable terminal device for updating software stored as compressed code in a nonvolatile memory provided in a portable terminal on the basis of differential data via wireless communication, the device comprising:
  a storage unit configured to include a file system area having a fault-tolerant property;
  a random-access memory configured to store the software; and
  data processing means for
    decompressing, at the execution of software updating, the compressed code of the software,
    loading the decompressed code into the random-access memory, updating the software in the random-access memory on the basis of the differential data,
    compressing the updated software, storing a backup of a compressed updated code sequence corresponding to a compressed updated portion of the compressed updated software in the file system area,
    writing the compressed updated code sequence corresponding to the compressed updated portion of the compressed updated software back to the nonvolatile memory only after storing, in the file system area, the backup of the compressed updated code sequence and position information indicating a position in the nonvolatile memory at which the backup should be written to if a power failure occurs, and
    writing, based on the position information, the compressed updated code sequence stored in the file system area to the nonvolatile memory after a failure occurs and after power is recovered,
  wherein the fault-tolerant property ensures that data, including the compressed updated code sequence, stored in the file system area is not damaged when the failure occurs,
  wherein, based on the differential data, only the backup of the compressed updated code sequence corresponding to the compressed updated portion of the compressed updated software in the nonvolatile memory and the position information are stored in the file system area.

6. The portable terminal device according to claim 5,
  wherein the failure relates to the writing back to the nonvolatile memory occurs due to a power-off at the execution of the software updating, and
  after the power is recovered, the data processing means writes the compressed updated code sequence stored in the file system area back to a corresponding area of the nonvolatile memory and then resumes the software updating.

7. The portable terminal device according to claim 5 or 6,
  wherein the software is divided into a plurality of components, the plurality of components are compressed, and the compressed plurality of components are stored in the nonvolatile memory,
  wherein at the execution of the software updating, the data processing means decompresses all the compressed plurality of components of the software, loads the decompressed components into the random-access memory, updates only a component to be updated in the random-access memory on the basis of the differential data, compresses only the updated component, and writes the compressed updated component back to a corresponding area of the nonvolatile memory.

8. The portable terminal device according to claim 7,
  wherein in the case of storing the compressed code of the software in the nonvolatile memory, the data processing means generates a data table defining positions where the compressed components are stored in the nonvolatile memory and stores the generated data table in a nonvolatile manner, and
  wherein in the case of storing the compressed updated component in the file system area, the data processing means identifies the position where the compressed updated component is to be stored in the nonvolatile memory by referring to the data table.

9. A portable terminal device for updating software stored as compressed code in a nonvolatile memory provided in a portable terminal on the basis of differential data via wireless communication, the device comprising:
  circuitry configured as:
  a storage unit configured to include a file system area having a fault-tolerant property;
  a random-access memory configured to store the software; and
  a data processing unit configured to
    decompress, at the execution of software updating, the compressed code of the software,
    load the decompressed code into the random-access memory,
    update the software in the random-access memory on the basis of the differential data, compress the updated software,
    store a backup of a compressed updated code sequence corresponding to a compressed updated portion of the compressed updated software in the file system area,
    write the compressed updated code sequence corresponding to the compressed updated portion of the compressed updated software back to the nonvolatile memory only after storing, in the file system area, the backup of the compressed updated code sequence and position information indicating a position in the nonvolatile memory at which the backup should be written to if a power failure occurs, and
    writing, based on the position information, the compressed updated code sequence stored in the file system area to the nonvolatile memory after a failure occurs and after power is recovered,
  wherein the fault-tolerant property ensures that data, including the compressed updated code sequence, stored in the file system area is not damaged when the failure occurs,
  wherein, based on the differential data, only the backup of the compressed updated code sequence corresponding to the compressed updated portion of the compressed updated software in the nonvolatile memory and the position information are stored in the file system area.

10. The software updating method according to claim 1, wherein the failure relates to damage to or a defect of an area of the nonvolatile memory resulting from an interrupted write operation.

11. The software updating method according to claim 10, wherein the interrupted write operation occurs when a power-off state occurs during the write operation.

12. The portable terminal device according to claim 9, wherein the failure relates to a power-off state.

13. The software updating method according to claim 1, wherein the file system area stores a telephone directory and electronic mail messages.

* * * * *